United States Patent
Thyagarajan et al.

(10) Patent No.: US 12,526,733 B2
(45) Date of Patent: Jan. 13, 2026

(54) NETWORK TELEMETRY CAPABILITIES DISCOVERY

(71) Applicant: Cisco Technology, Inc., San Jose, CA (US)

(72) Inventors: Ajit Thyagarajan, Bethesda, MD (US); Sajini G, Tamil Nadu (IN); Rana Ruhi, Bangalore (IN); Arun Kumar Subramanian, Tamil Nadu (IN); Frank Brockners, Cologne (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 378 days.

(21) Appl. No.: 17/896,720

(22) Filed: Aug. 26, 2022

(65) Prior Publication Data

US 2024/0073791 A1 Feb. 29, 2024

(51) Int. Cl.
*H04W 48/16* (2009.01)
*H04L 5/00* (2006.01)
*H04W 4/70* (2018.01)

(52) U.S. Cl.
CPC ........... *H04W 48/16* (2013.01); *H04L 5/0048* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 10,938,663 B2 | 3/2021 | Barnard et al. | |
| 10,999,331 B1 * | 5/2021 | Marchand | H04W 48/16 |
| 11,315,683 B2 * | 4/2022 | Yoder | G16H 40/67 |
| 2017/0064488 A1 * | 3/2017 | Granzow | H04W 4/70 |
| 2018/0323997 A1 * | 11/2018 | Bag | H04L 67/34 |
| 2020/0145288 A1 | 5/2020 | Mermoud et al. | |
| 2020/0186985 A1 * | 6/2020 | Dinata | H04W 76/10 |
| 2021/0218594 A1 * | 7/2021 | Sundararajan | H04W 4/70 |
| 2021/0367839 A1 * | 11/2021 | Vanderveen | H04W 4/70 |
| 2022/0058042 A1 | 2/2022 | Vanjare et al. | |

(Continued)

FOREIGN PATENT DOCUMENTS

| | | |
|---|---|---|
| WO | 2021/073392 A1 | 4/2021 |
| WO | 2021/082844 A1 | 5/2021 |

OTHER PUBLICATIONS

Mazhar, et al. "Role of Device Identification and Manufacturer Usage Description in IoT Security: A Survey," IEEE Access, Mar. 2021, 30 pages.

(Continued)

*Primary Examiner* — Chirag G Shah
*Assistant Examiner* — Benjamin Peter Welte
(74) *Attorney, Agent, or Firm* — Edell, Shapiro & Finnan, LLC

(57) ABSTRACT

Methods for discovering telemetry retrieval capabilities of telemetry devices. The methods include a computing device obtaining telemetry capability related information for one or more telemetry devices and determining one or more telemetry retrieval methods supported by each of the one or more telemetry devices based on the telemetry capability related information. The methods further include obtaining telemetry data based on the one or more telemetry retrieval methods determined to be supported by a respective telemetry device.

20 Claims, 7 Drawing Sheets

(56) References Cited

U.S. PATENT DOCUMENTS

2023/0042610 A1* 2/2023 Barton .................... H04L 63/20
2023/0124811 A1* 4/2023 Jiménez ................. H04W 4/70

OTHER PUBLICATIONS

Mr. Optmina, "Auto-Discovering IoT Devices Using mDNS," https://www.optimatele.com/auto-discovering-iot-devices-using-mdns/, May 2021, 12 pages.

CISCO DevNet, "What is MUD?," Manufacturer Usage Description—Document, retrieved from https://developer.cisco.com/docs/mud/#!what-is-mud/what-is-mud, on May 6, 2022, 2 pages.

Wikipedia, "Simple Service Discovery Protocol," https://en.wikipedia.org/wiki/Simple_Service_Discovery_Protocol, Mar. 29, 2022, 3 pages.

Wildes, et al., "A YANG Data Model for Syslog Configuration," draft-ietf-netmod-syslog-model-17, NETMOD WG, Internet-Draft, Sep. 8, 2017, 23 pages.

Lear, et al., "Manufacturer Usage Description Specification," Internet Engineering Task Force (IETF), Request for Comments: 8520, Mar. 2019, 120 pages.

* cited by examiner

```
{
  "ietf-mud : mud : {
    "mud-version" : 1'
    "mud-url" : "https://iot-device.example.com/dnsname",
    "last-update" : "2019-01-15T10 : 22 : 47+00 : 00",
    "cache-validity": 48,
    "is-supported" : true,
    "systeminfo" : "This is an example of a device that just wants to talk to its telemetry broker",
    "mfg-name" : "Example, Inc.",
    "documentation": "https://iot-device.example.com/doc/dnsname:,
    "model-name" : "dnsname"
  },
  "ietf-capability" : {
    "telemetry-service" : [
      {
        "enabled" : false,
        "port" : 9000
      }
    ],
    "syslog" : [
      {
        "access-policy" : {
          "enabled" : true,
          "command" : "show running-config system settings logging"
        }
      },
      {
        "access-policy" : {
          "enabled" : true,
          "status-command" : "GET /api/operational/system/settings/logging?deep HTTP/1.1"
        }
      }
    ],
    "custom-capability1" : [
      {
        "capability-description" : "Custom HTTP Application",
        "access-policy" : {
          "enabled" : {
            "enabled" : true,
            "status-command" : "GET /my-server : 80/status HTTP/1.1"
          }
        }
      }
    ]
  }
}
```

NETWORK TELEMETRY CAPABILITIES DISCOVERY

TECHNICAL FIELD

The present disclosure generally relates to networks, and more particularly, to network management.

BACKGROUND

Network devices such as routers, switches, and sensors, offer various information about their state. How to obtain this information is different for various devices and is based on device capabilities and/or configurations. For example, devices may provide telemetry data via a myriad set of protocols such System Logging Protocol (Syslog), Simple Network Management Protocol (SNMP), Network Configuration (Netconf)/Yet Another Next Generation (YANG), Command-line Interface (CLI), Remote Procedure Call (gRPC), Kafka, Messaging Queuing Transport (MQTT), Statsd, and Application Programming Interface (API) calls. Discovery of the telemetry data gathering capabilities of each device is a manual task in which a configuration file of the respective network device is examined.

BRIEF DESCRIPTION OF THE DRAWINGS

FIG. 5 illustrates a MUD file that includes telemetry retrieval methods of the MUD-capable device of FIG. 4, according to an example embodiment.

DETAILED DESCRIPTION

Overview

Figure 1:
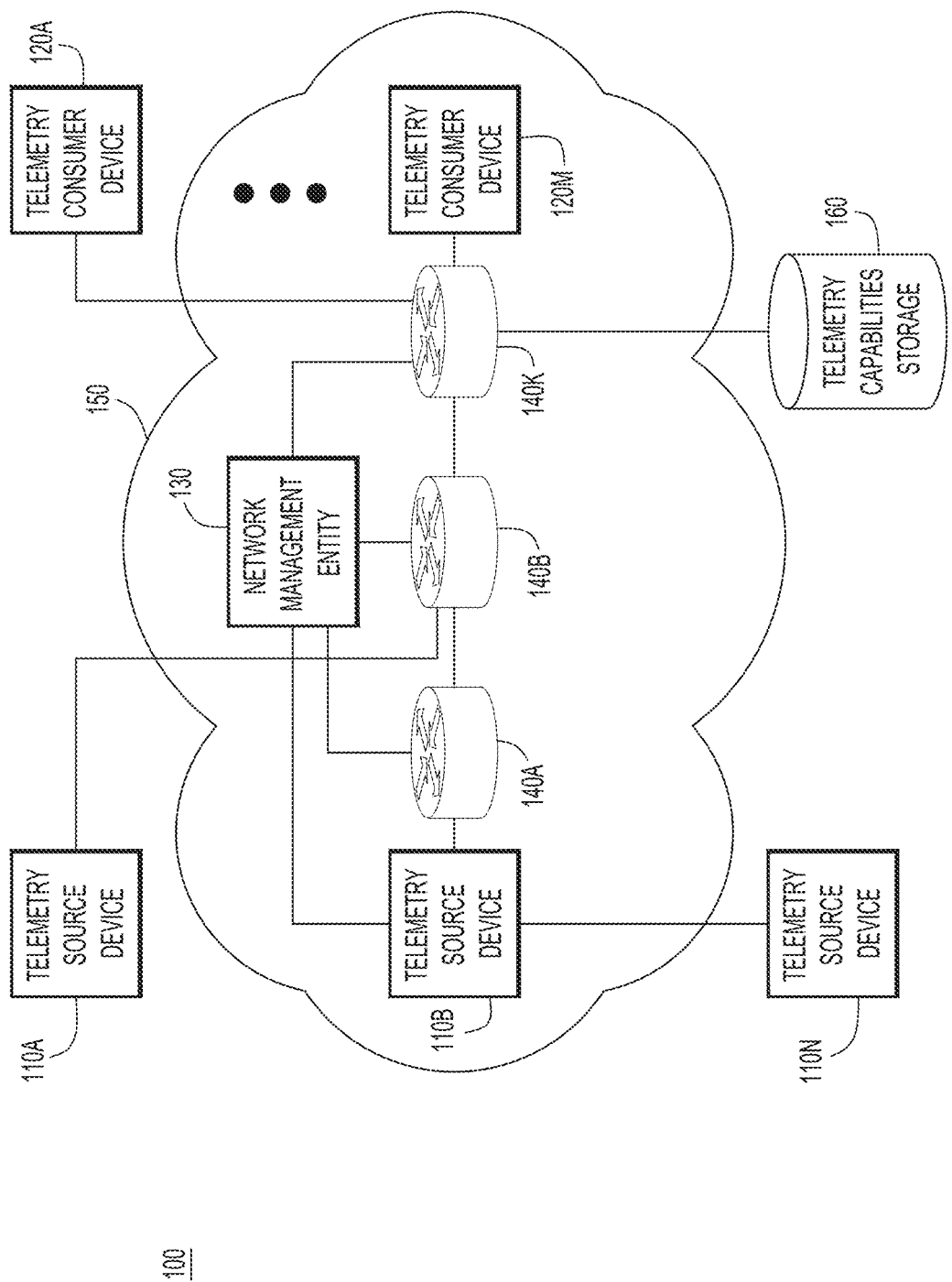
FIG. 1 is a block diagram illustrating a system in which telemetry capabilities of telemetry devices are discovered, according to an example embodiment.

Techniques are provided for a mechanism to obtain telemetry data gathering and/or providing capabilities of one or more telemetry devices such as telemetry source devices and/or telemetry consumer devices. The telemetry data gathering and/or providing capabilities include retrieval or providing methods supported by a respective network device (a telemetry device). A management device determines which telemetry retrieval protocols are supported by various telemetry devices in a network.

In one form, a computing device obtains telemetry capability related information for one or more telemetry devices and determines one or more telemetry retrieval methods supported by each of the one or more telemetry devices based on the telemetry capability related information. The computing device further obtains telemetry data based on the one or more telemetry retrieval methods determined to be supported by a respective telemetry device.

Example Embodiments

Operators need to know telemetry data gathering capabilities of devices to configure the observability and management systems accordingly in order to retrieve telemetry data related information from these devices. Understanding telemetry gathering capabilities offered by various devices is challenging. There is no gathering capability discovery service which would track the availability of telemetry devices and changes in their respective telemetry gathering capabilities. There are no services that allow operators to retrieve which methods (protocols and associated information) for telemetry data retrieval services are available from the telemetry devices.

Telemetry data gathering related configurations may include an operator manually configuring the telemetry source device (e.g., router or a switch) to export the telemetry data in one of the supported formats to specific consumers and/or configuring the consumer of telemetry data (e.g., analytics platform) to retrieve telemetry data from the various telemetry source devices (if the telemetry source device offers retrieval of that telemetry data). This manual process can lead to various issues such as configuration errors at telemetry source devices and telemetry consumer devices, and mismatched capabilities. For example, the telemetry source device exports in one format but the consumer device does not support it. This problem is exacerbated in large networks with thousands of telemetry source devices where the overall telemetry data gathering capabilities could be changing continuously. Some telemetry data retrieval tools offer playbooks to assist in telemetry data delivery but these playbooks are still built on top of manual processes for determining the telemetry capabilities of the device such as a device specification guide. While some techniques may allow for static telemetry capabilities/parameters exchange between the telemetry source device and a telemetry consumer device, these techniques occur within a specific telemetry retrieval protocol known to be supported by both the telemetry source device and the consumer through a manual process.

In one or more example embodiments, techniques are provided that allow for a generic discovery of telemetry capabilities of telemetry source devices and/or consumers, collectively referred to as "telemetry devices". This discovery is not tied to a particular telemetry protocol but involves generic discovery techniques in which the telemetry source devices and/or telemetry consumer devices (telemetry devices) continuously advertise and/or publish their current telemetry related capabilities so that configuration tools do not have to rely on manual processes.

Telemetry data, sometimes called "collection data" or "measurement data", are values obtained from monitoring i.e., monitoring by network devices performance of a network. In the case of packet processing devices, the telemetry data includes various information such as identifiers, timestamps, interfaces visited, queue depth, etc., for each network device the packet traverses along the path.

Telemetry data retrieval tools or gathering capabilities refer to ways or methods in which a device provides or obtains telemetry data such as protocols supported by the respective device for providing/sending/transmitting and/or fetching/gathering/collecting telemetry data. Some examples of the telemetry retrieval protocols are System Logging Protocol (Syslog), Simple Network Management Protocol (SNMP), Network Configuration (Netconf)/Yet Another Next Generation (YANG), Command-line Interface (CLI), Remote Procedure Call (gRPC), Kafka, Messaging Queuing Transport (MQTT), Statsd, Application Programming Interface (API) calls, etc. Retrieval tools related services or information may provide additional details (configuration parameters) about type of services supported or various configurations of the retrieval tool such as Syslog is on port 9177 and Netconf is on a default port, etc.

The techniques presented herein obtain telemetry capabilities of one or more telemetry devices. First, static/device-type focused telemetry data recovery-capability discovery is performed in which telemetry capability related information is obtained. For example, a telemetry device announces a reference to (such as a location or a pointer to a location) where a network management entity e.g., a broker or a management device, can retrieve the telemetry data gathering capabilities of the respective telemetry device. The telemetry gathering capabilities may be in a form of the telemetry device with an identifier (ID) "xyzzy" supports telemetry retrieval protocol "Syslog" over port 443. Second, dynamic/device focused telemetry data recovery-capability discovery is performed in which dynamic configuration parameters i.e., the configuration parameters that may change during an operation or run time of the telemetry device, are obtained. Specifically, the network management entity retrieves information about the retrieval capabilities and/or configuration parameters directly from a specific telemetry device, for example, at fixed intervals or when a change in configuration parameters occurs. The network management entity may retrieve the telemetry capabilities of the respective telemetry device via polling or by obtaining updates via a push notification of a publish/subscribe service. For example, the device with ID "xyz" does not offer Syslog over the default port, but over port 9177. These techniques are explained in further detail below.

FIG. 1 is a block diagram illustrating a system 100 in which telemetry capabilities of telemetry devices are discovered, according to an example embodiment. In FIG. 1, the system 100 includes a plurality of telemetry source devices 110A-N, a plurality of telemetry consumer devices 120A-120M, a network management entity 130 that controls a plurality of network devices including routing devices 140A-K and the second telemetry source device 110B. The plurality of network devices transport packets across one or more network(s) 150. The system 100 further includes a telemetry capabilities storage 160, which stores telemetry capabilities such as supported telemetry retrieval methods and respective configuration parameters for the plurality of telemetry source devices 110A-N and the plurality of telemetry consumer devices 120A-120M.

The notation "a-n", "a-m", "a-k", "a-j", "a-h", "a-g", "a-p", and "a-q", and the like denote that a number is not limited, can vary widely, and depend on a particular use case scenario. Further, this is only an example of the system 100, and the number and types of entities may vary based on a particular deployment and use case scenario, such as the type of service being provided and network structures of various network(s) 150. For example, while only one telemetry capabilities storage 160 is depicted, it is understood that there may be multiple different telemetry capability storages or entities. In one example, the telemetry capabilities storage 160 involves a number of entities such as a Manufacturer Usage Description (MUD) manager, MUD server and/or a MUD file storage.

The plurality of network devices transport packet flows from a data source device, such as the third telemetry source device 110N, to a data sink device, such as the first telemetry source device 110A, across one or more network(s) 150. The telemetry consumer devices 120A-M are telemetry collectors that collect and process telemetry data from the telemetry source devices 110A-N. The telemetry consumer devices 120A-M may include one or more analytics.

In various example embodiments, the entities of the system 100 (the plurality of telemetry source devices 110A-N, the plurality of telemetry consumer devices 120A-M, the routing devices 140A-140K, the network management entity 130, and the telemetry capabilities storage 160) may each include a network interface, at least one processor, and a memory. Each entity may be any programmable electronic device capable of executing computer readable program instructions. The network interface may include one or more network interface cards (having one or more ports) that enable components of the entity to send and receive data over the network(s) 150. Each entity may include internal and external hardware components such as those depicted and described in further detail in FIG. 7. In one example, at least some of these entities may be embodied as virtual devices with functionality distributed over a number of hardware devices such as virtual switches, routers, etc.

The data source device and the data sink device may be a computer or client device or an endpoint that generates data based on input from an operator, or may be a service running on a server that responds to requests or performs actions based on the requests. The plurality of network devices are transport nodes that include a network source device, intermediate network devices (transit nodes), and a network sink device. The network devices may include, but are not limited to switches, virtual routers, leaf nodes, spine nodes, etc. The network devices include a central processing unit (CPU), a memory, a packet processing logic, an ingress interface, an egress interface, one or more buffers for storing various packets of various traffic flows, and one or more interface queues such as those depicted and described below.

The telemetry consumer devices 120A-M may be a telemetry collector, a network analysis entity, or a software application that stores and analyzes telemetry data to assess network performance or to perform a troubleshooting task. In one example, the telemetry consumer devices 120A-M may simply process and store the telemetry data for analysis by a different device. For example, the telemetry consumer devices 120A-M may provide the telemetry data to the network management entity 130 such as a network controller or an external telemetry broker. The network management entity 130 may then analyze the telemetry data and configure or reconfigure one or more of the network devices and/or network links in the network(s) 150 based on this analysis. The network management entity 130 may be referred to as a "telemetry broker". In at least one example, the telemetry broker may be an external entity. The telemetry broker is configured to discover telemetry capabilities related information of various telemetry devices.

In one example embodiment, one or more of the telemetry consumer devices 120A-M and the network management entity 130 are integrated into a single device that analyzes the telemetry data and controls the network devices and the links based on the analyzed telemetry data and rules or policies for the network(s) 150. The network management entity 130 controls the network devices and links by configuring or reconfiguring parameters therein.

In another example embodiment, the network management entity 130 may be an external telemetry broker that selects one or more of the telemetry consumer devices 120A-M, e.g., second telemetry consumer device 120M and obtains supports telemetry retrieval methods. The network management entity 130 also selects one or more of the telemetry source devices 110A-N, e.g., second telemetry source device 110B and obtains supported telemetry retrieval methods. The supported telemetry retrieval methods of these network devices may be obtained from the telemetry capabilities storage 160. The network management entity 130 analyzes the supported telemetry retrieval methods of these network devices and configures the second telemetry source device 110B and the second telemetry consumer device 120M with the same telemetry retrieval protocol to avoid any mismatches. Based on this configuration the second telemetry source device 110B and the second telemetry consumer device 120M establish an initial connection for obtaining telemetry data from the second telemetry source device 110B.

In one or more example embodiments, the network management entity 130 and/or the telemetry consumer devices 120A-M are configured to collect telemetry data from one or more of the telemetry source devices 110A-N based on a particular use case scenario.

While the routing devices 140A-K are depicted as routing data, one or more of these routing devices 140A-K may be configured by the network management entity 130 to be a telemetry source device depending on a particular use case scenario. The telemetry source devices 110A-N may be endpoint devices and/or network devices such as industrial switches, routers, Internet of Things (IoT) devices, etc., that generate and provide telemetry data.

The telemetry consumer devices 120A-M are configured to obtain and analyze telemetry data from one or more of the telemetry source devices 110A-N. In at least one example embodiment, the network management entity 130 may be one of the telemetry consumer devices 120A-M.

The telemetry source devices 110A-N and the telemetry consumer devices 120A-M, each support one or more telemetry retrieval methods that may differ from one device to another device. As noted above, the telemetry source devices 110A-N and the telemetry consumer devices 120A-M may collectively be referred to as "telemetry devices".

Figure 2:
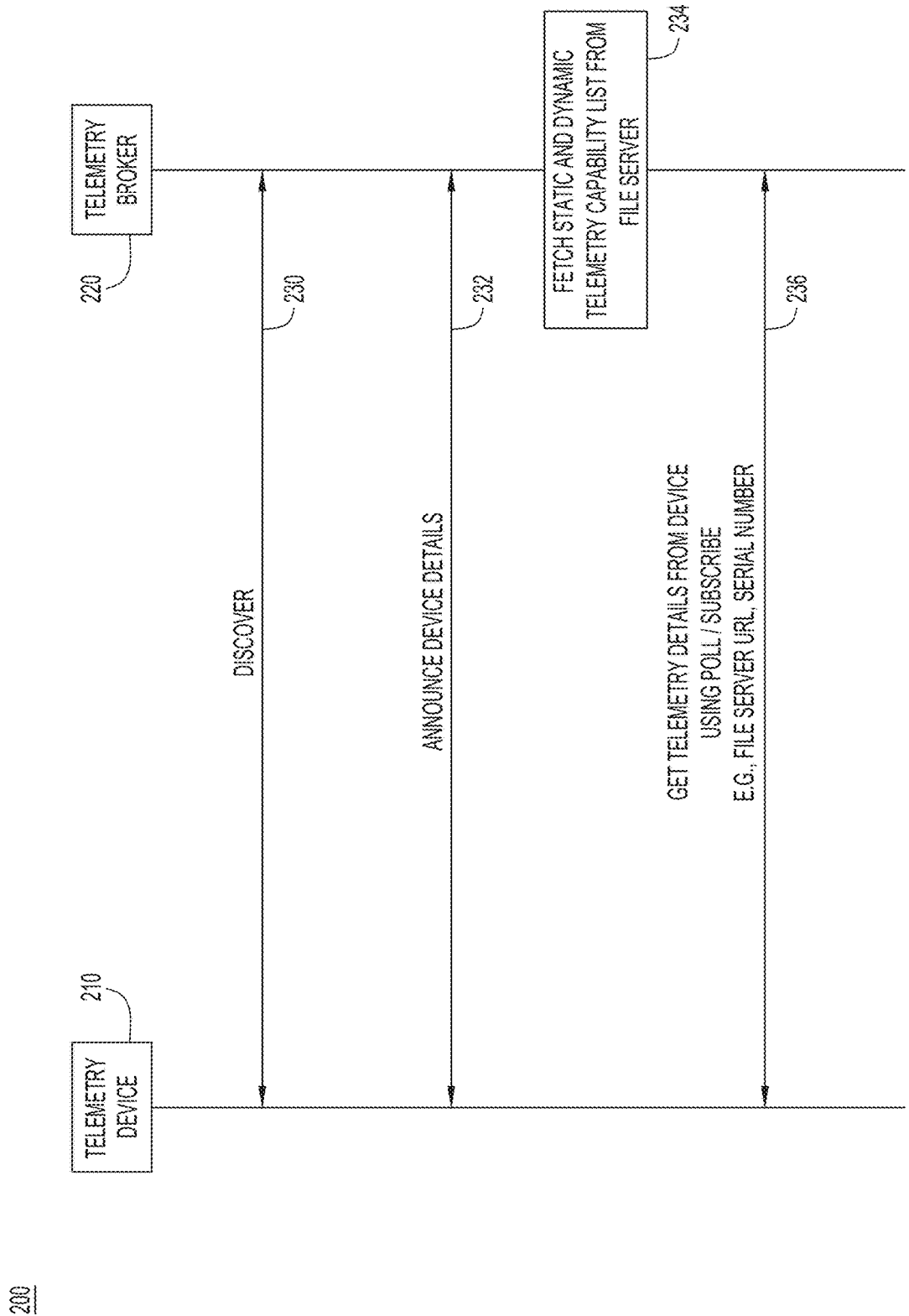
FIG. 2 is a sequence diagram illustrating, at a high-level, a discovery process in which telemetry retrieval methods supported by a telemetry device are obtained, according to an example embodiment.

FIG. 2 is a sequence diagram illustrating, at a high-level, a discovery process 200 in which telemetry retrieval methods supported by a telemetry device are obtained, according to an example embodiment. The discovery process 200 involves a telemetry device 210 such as one of the telemetry devices explained above with reference to FIG. 1 and a telemetry broker 220 such as the telemetry broker explained above with reference to FIG. 1.

The discovery process 200 begins at 230. At 230, the telemetry device 210 and the telemetry broker 220 discover the presence or existence of each other. For example, the telemetry device 210 (e.g., a network device) and the telemetry broker 220 (e.g., a network management entity) may establish a connection using Dynamic Host Configuration Protocol (DHCP).

At 232, telemetry capability related information of the telemetry device 210 is shared with the telemetry broker 220. In one example, the telemetry broker 220 may request telemetry capability related information from the telemetry device. In another example, the telemetry device 210 may announce the telemetry capability related information.

The telemetry capability related information is a reference that allows the telemetry broker 220 to obtain one or more telemetry retrieval methods supported by the telemetry device 210. This reference maybe in a form of a pointer, a uniform resource locator (URL) to a file server such as the telemetry capabilities storage 160 of FIG. 1, a serial number and a MUD URL to a MUD server, etc. A variety of protocols may be used to announce the telemetry capability related information such as the Dynamic Host Configuration Protocol (DHCP). This is one example of a static method for obtaining one or more telemetry retrieval methods. In another example, the methods are dynamic as described below.

This reference or telemetry capability related information serves as a device-type focused announcement because the telemetry device 210 announces information that allows an external entity such as the telemetry broker 220 to retrieve supported telemetry retrieval methods and other information about the telemetry device 210 defined at the manufacturing time. The reference is specific to the type/model of the telemetry device 210 and is independent from an actual deployment of the telemetry device 210.

According to one example embodiment, an announcement may be in a form of one or more packets. Content of the announcement includes: (1) an identifier of the telemetry device 210, such as a MAC address, etc. and (2) a reference to a repository (the telemetry capabilities storage 160 of FIG. 1 with device-type specific retrieval information) such as a file server. A reference may be a repository Uniform Resource Locator (URL), a link to a MUD file server, etc.

When the telemetry broker 220 receives the reference to a file server along with the device identifier, at 234, the telemetry broker 220 obtains retrieval capability list or information from the repository. Specifically, the telemetry broker 220 obtains telemetry retrieval methods supported by the telemetry device 210 that are defined at a manufacturing time. The telemetry retrieval methods are static telemetry capabilities of the telemetry device 210 and include standard applications or initial telemetry retrieval protocols such as SNMP, Netconf, Syslog, YANG, etc. For example, the telemetry broker 220 obtains that [The telemetry device 210 with ID "xyz" offers telemetry data retrieval services via Syslog and Kafka]. This is particularly useful because not all telemetry devices can support every telemetry retrieval protocol. These telemetry retrieval protocols are for establishing an initial connection with the telemetry device 210 to obtain telemetry data.

The telemetry broker 220 further discovers the telemetry data capability services that may be offered by the telemetry device 210 such as another file server, URL, serial number, etc. These telemetry data capability services are an example of dynamic methods noted above and allow the telemetry broker 220 to obtain runtime or dynamic changes to configuration parameters of the supported telemetry retrieval protocol. That is, configuration parameters of the telemetry retrieval protocols are changeable over time when the telemetry device 210 is in an operational state. For example, applications or supported telemetry retrieval protocols change an operating state or configuration parameters (e.g., port) during runtime. Thus, dynamic capability discovery is useful to detect these changes in telemetry capabilities of the telemetry device 210. In other words, the information available at the manufacturing time may not be sufficient or valid during runtime of the telemetry device 210 because the telemetry retrieval protocols and/or configuration parameters of the telemetry device 210 may have changed at the deployment time. For example, Syslog messages sent to an external host are changed during runtime or the telemetry device 210 uses a different port (not port 443 for Syslog but port 9177 instead). To address the runtime specific additions or changes, methods are defined for detecting or discovering an operational state of the supported telemetry retrieval protocol and/or configuration parameters for the supported telemetry retrieval protocol at runtime i.e., during the operation of the deployed telemetry device 210.

At 236, the telemetry broker 220 obtains gathering-capability information at runtime via a subscription or periodic polling of the telemetry device, based on the discovered telemetry data capability services. As such, the telemetry broker 220 is updated at runtime with dynamically changing retrieval capabilities of the telemetry device 210 such as the operational state of the supported telemetry retrieval protocol(s) and/or configuration parameter changes for the supported telemetry retrieval protocol(s).

The techniques presented herein provide the telemetry broker 220 with information about initial telemetry retrieval capabilities such as telemetry data retrieval methods/protocols supported by the telemetry device 210 and telemetry data capability services supported or offered by the telemetry device 210 to detect changes at the deployment/runtime of the telemetry device 210. The telemetry capability related information may be in a form of a pointer to a location where the telemetry retrieval methods supported by the telemetry device 210 are stored, and to information about telemetry data capability services provided by the telemetry device 210.

By discovering the supported telemetry retrieval protocol, the telemetry broker 220 may establish a connection with the telemetry device 210 using this supported telemetry retrieval protocol and the configuration parameters for this supported telemetry retrieval protocol. Further, when the configuration parameters change overtime, the telemetry broker 220 may reconfigure the existing connection with the telemetry device 210. In another example embodiment, the telemetry broker 220 is a network controller such as the network management entity 130 of FIG. 1 that provides the discovered supported telemetry retrieval methods and configuration parameters to a telemetry collector such as one of the telemetry consumer devices 120A-M of FIG. 1.

Figure 3:
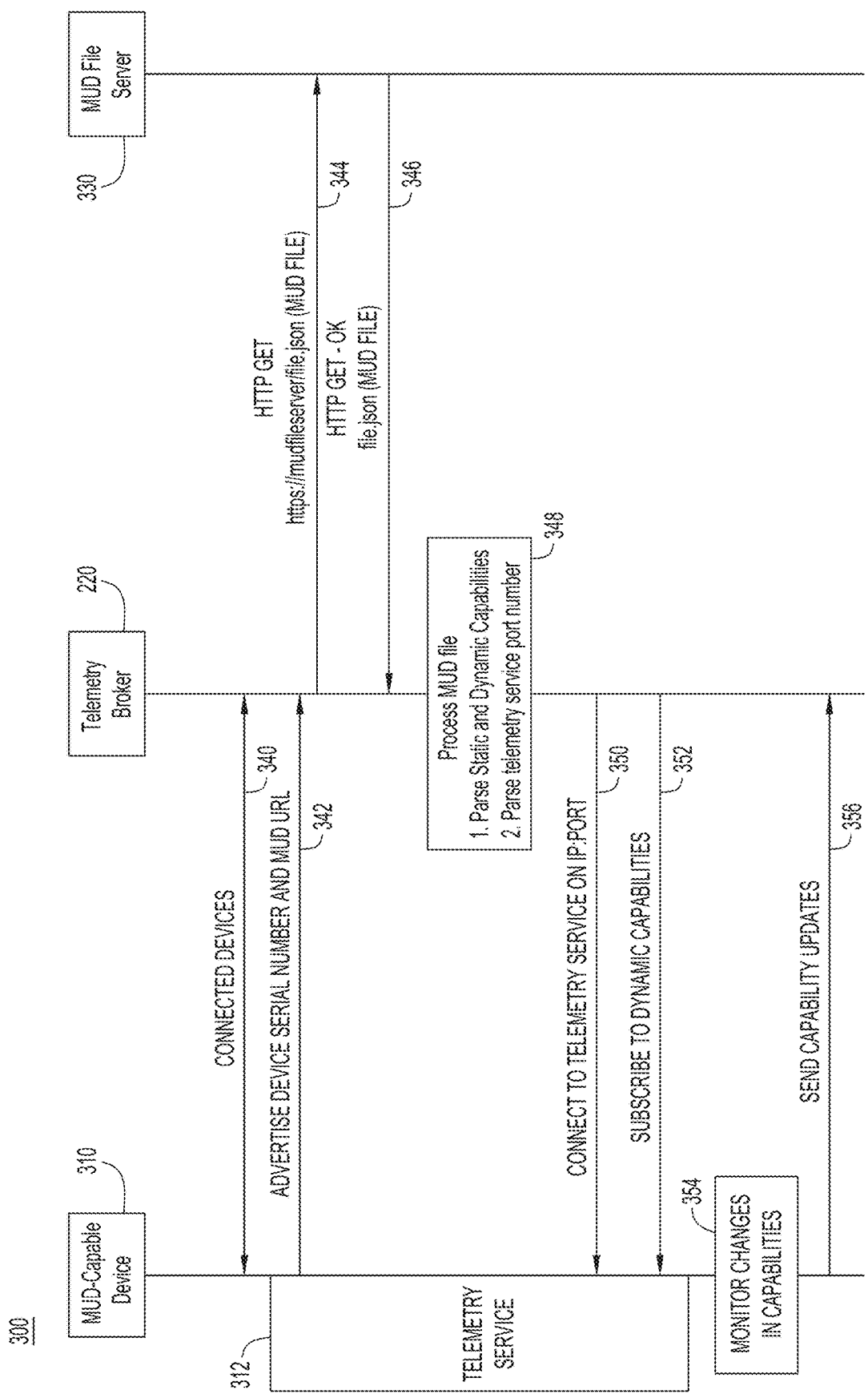
FIG. 3 is a sequence diagram illustrating a discovery process in which telemetry data retrieval capabilities changes are obtained by subscribing to a telemetry service executed on a Manufacturer Usage Description (MUD)-capable telemetry device, according to an example embodiment.

FIG. 3 is a sequence diagram illustrating a discovery process 300 in which telemetry data retrieval capabilities changes are obtained by subscribing to a telemetry service being executed on a MUD-capable device, according to an example embodiment. The discovery process 300 involves a MUD-capable device 310, which is an example of the telemetry device 210 of FIG. 2, the telemetry broker 220 of FIG. 2, and a MUD file server 330, which is an example of telemetry capabilities storage 160 of FIG. 1.

The MUD-capable device 310 is a network device whose supported telemetry retrieval methods are to be determined. The MUD-capable device 310 runs or executes a telemetry data capability providing or telemetry discovery service, referred to as telemetry service 312. The telemetry service 312 provides one or more configuration parameters of the supported telemetry retrieval protocols that are changeable over time while the MUD-capable device 310 is in an operational state i.e., running and deployed in the network. The telemetry service 312 is configured to detect one or more changes in telemetry capabilities of the MUD-capable device 310. Based on these changes obtained from the telemetry service 312, the telemetry broker 220 or a management device may reconfigure an existing connection with the MUD-capable device 310. Additionally, a service port of the MUD-capable device 310 is fetched through the MUD file server 330. The telemetry service 312 accepts requests from the telemetry broker 220, internally queries the MUD-capable device 310 for information about configuration changes and operational status/states and obtains a response, which is then returned to the telemetry broker 220. Since telemetry retrieval tool related information is enabled for external entities in a MUD file, the network device is called the MUD-capable device 310.

In this example, the telemetry broker 220 is an external entity responsible for collecting and delivering the telemetry capabilities such as telemetry retrieval methods/telemetry protocols supported by the MUD-capable device 310 and at least one configuration parameter for the supported telemetry retrieval protocols.

The MUD file server 330 stores the telemetry retrieval methods in a form of a MUD file of the MUD-capable device 310 along with the port on which the telemetry service 312 is being executed by the MUD-capable device 310. The MUD file server 330 accepts requests from the telemetry broker 220 and provides a MUD file to the telemetry broker. The MUD file includes supported telemetry retrieval methods and configuration parameters and may further include information about the telemetry service 312 that is executing on the MUD-capable device 310.

The discovery process 300 starts at 340. At 340, the MUD-capable device 310 connects with the telemetry broker 220 via network devices such as switches, routers, etc. explained with reference to FIG. 1. When the two devices are connected, the telemetry broker 220 discovers that the MUD-capable device 310 is executing the capability providing service. At 342, the MUD-capable device 310 announces its telemetry capability related information, which may include a serial number of the MUD-capable device 310 and an URL to the MUD file server 330. Any announcement protocol may be used to send the above details to the telemetry broker 220 such as the DHCP protocol.

At 344, the telemetry broker 220 extracts the MUD URL and sends a request to the MUD file server 330. In one example, the request may be in a form of an HTTP get request such as https://mudfileserver/file.json. The MUD file server 330 retrieves from a MUD file repository a MUD file based on the serial number of the MUD-capable device 310 and at 346, returns a MUD file that includes static and dynamic retrieval capabilities and port number of the retrieval service and other related configuration settings. For example, static retrieval capability may describe that the MUD-capable device 310 supports a particular telemetry retrieval protocol (Netconf enabled, Syslog enabled, etc.) and a dynamic retrieval capability may describe protocol configurations (Syslog configurations such as port number, etc.).

At 348, the telemetry broker 220 processes the MUD file and extracts static and dynamic telemetry capabilities of the MUD-capable device 310. Using the information extracted from the MUD file e.g., the port number, at 350, the telemetry broker 220 connects to the telemetry service 312. At 352, the telemetry broker 220 subscribes to one or more of the telemetry retrieval services offered by the MUD-capable device 310 for various dynamically changing configuration parameters such as port numbers, etc.

At 354, the telemetry service 312 continuously monitors changes in supported telemetry protocols and their configuration parameters and at 356, the telemetry service 312 sends updates to one or more subscribers (entities subscribed to the telemetry service 312) such as the telemetry broker 220. For example, the updates may indicate that Syslog external host changed during runtime, Syslog is disabled, etc.

Figure 4:
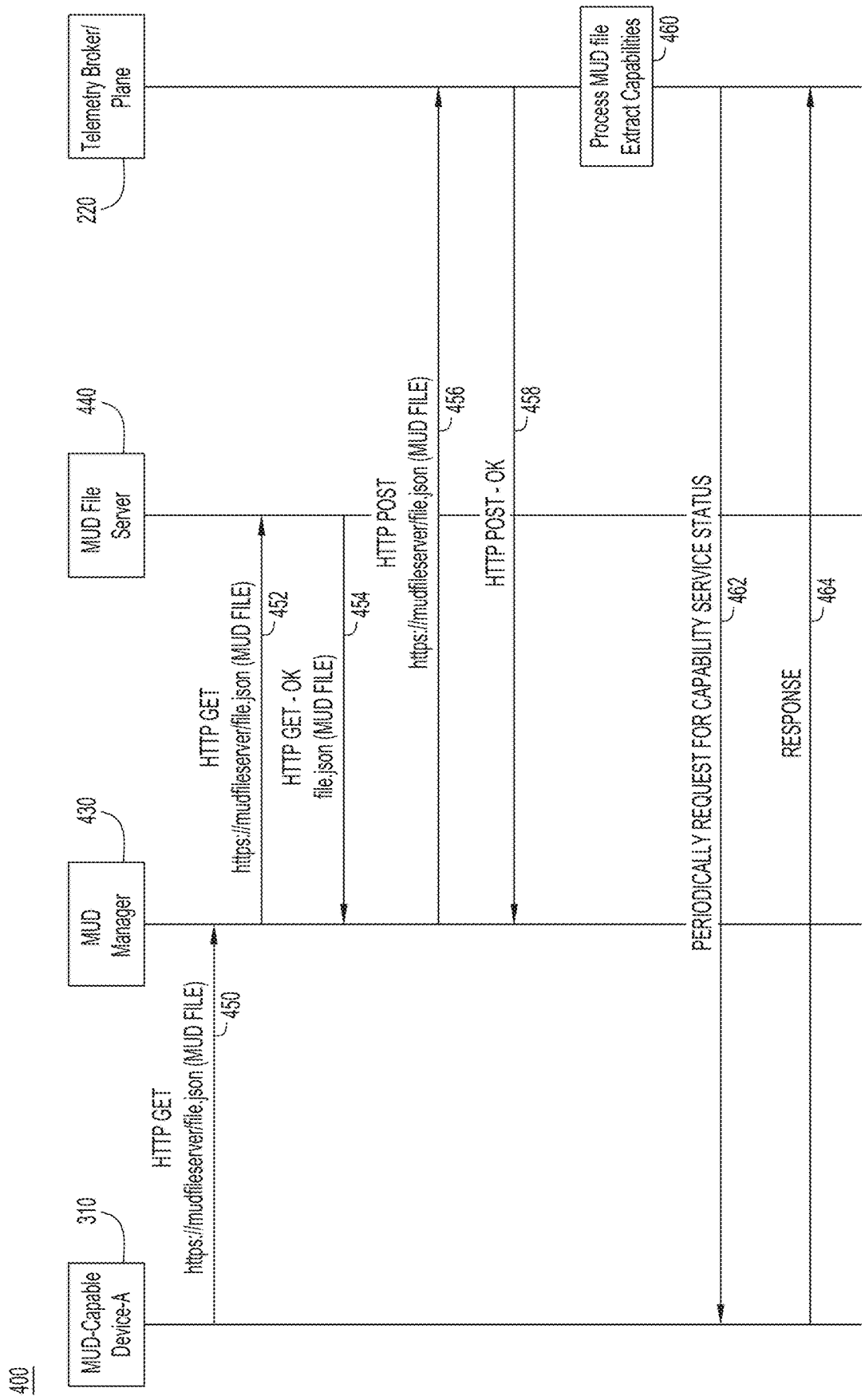
FIG. 4 is a sequence diagram illustrating a discovery process in which telemetry data retrieval capability changes are discovered at runtime by periodically polling a MUD-capable telemetry device, according to another example embodiment.

FIG. 4 is a sequence diagram illustrating a discovery process 400 in which telemetry data retrieval capability changes are discovered at runtime by periodically polling a MUD-capable device 310 of FIG. 3, according to another example embodiment.

The discovery process 400 involves the MUD-capable device 310 of FIG. 3, which is an example of the telemetry device 210 of FIG. 2, the telemetry broker 220 of FIG. 2, and a MUD manager 430 and a MUD file server 440, which are another example of the telemetry capabilities storage 160 of FIG. 1.

The telemetry broker 220 maintains a physical/logical entity that periodically probes the MUD-capable device 310 for updating the dynamically changing capabilities (operational states) and/or telemetry configuration parameters of the supported telemetry retrieval protocols (port number, disabled, etc.).

The MUD manager 430 communicates with the MUD-capable device 310 to obtain and store the telemetry retrieval methods and configuration parameters thereof and communicates with the telemetry broker 220 to provide telemetry retrieval methods supported by the telemetry broker 220. The MUD manager 430 manages the MUD file server 440 that stores the telemetry retrieval methods and configurations (in the form of a MUD file) for the telemetry devices.

The discovery process 400 begins at 450. At 450, the MUD-capable device 310 sends a MUD URL to the MUD manager 430 over protocols such as DHCP and/or Link Layer Discovery Protocol (LLDP). The MUD manager 430 receives the request, which may be in a form of an HTTP GET and at 452, queries the MUD file server 440. At 454, the MUD manager 430 obtains the MUD file from the MUD file server 440 (HTTP GET-OK) and at 456, forwards the MUD file which includes static and dynamic capabilities of the MUD-capable device 310 to the telemetry broker 220. At 458, the telemetry broker 220 acknowledges that the MUD file is received e.g., HTTP POST OK.

With continued reference to FIG. 4, FIG. 5 is a view illustrating a MUD file 500 that includes telemetry retrieval methods of the MUD-capable device 310, according to an example embodiment. The MUD file 500 includes general information 510, telemetry service availability 512, telemetry retrieval methods 514, custom telemetry capabilities 516.

The general information 510 includes telemetry capability related information such as a MUD URL, version of the MUD file 500, last update date and time, cache validity, whether telemetry is included, name/model and serial number of the MUD-capable device 310, a reference to specification of the MUD-capable device 310, etc.

The telemetry service availability 512 indicates whether a telemetry service such as the telemetry service 312 of FIG. 3 is enabled on a MUD-capable device 310. If the telemetry service is enabled, configuration parameters to reach the telemetry service are provided, such as the port number.

The telemetry retrieval methods 514 includes one or more telemetry retrieval protocols supported by the MUD-capable device 310. For each telemetry retrieval protocol, configuration parameters and access policies are described. For example, the MUD file 500 indicates that syslog is enabled on the MUD-capable device 310.

Syslog configuration parameters, however, may change during runtime of the MUD-capable device 310. To track these changes, different protocols are available such as CLI, telnet, Netconf, etc. Since not all devices support all telemetry retrieval protocols, the telemetry broker 220 needs to know in advance the different ways to fetch the dynamically changing configuration parameters. Accordingly, the MUD file includes commands/protocols to check the operating state of the telemetry retrieval protocol and/or changes in the configuration parameters. Specifically, the MUD file 500 contains different commands (ways) to check the status of the telemetry retrieval protocols supported by the MUD-capable device 310. For example, some of these commands may include:

> show running-config system setting logging <host>
> Netconf (get-syslog-events), and
> various other ways.

This information is useful for the telemetry broker 220 to view the telemetry retrieval methods and their configurations in real-time, during the operation of the MUD-capable device 310.

The custom telemetry capabilities 516 include custom telemetry retrieval methods supported by the MUD-capable device 310. For example, the telemetry broker 220 may obtain the operating state of a telemetry retrieval protocol using a custom Hypertext Transfer Protocol (HTTP) application.

Referring back to FIG. 4, at 460, the telemetry broker 220 analyzes the MUD file 500. Based on the MUD file 500, the telemetry broker 220 determines that the MUD-capable device 310 supports syslog telemetry retrieval protocol and that syslog configuration parameters may change during runtime. The syslog telemetry retrieval protocol is an example of a telemetry protocol used to establish an initial connection with the MUD-capable device 310 to retrieve telemetry data.

The telemetry broker 220 further determines that to check the operating state of syslog telemetry retrieval protocol and its configuration parameters, commands such as "show running-config system setting logging <host>" may be used. In other words, the telemetry broker 220 extracts one or more commands based on the monitoring related information included in the MUD file 500.

At 462, the telemetry broker 220 periodically polls or queries the MUD-capable device 310 for an operational state of the syslog telemetry retrieval protocol and/or configuration changes. For example, the telemetry broker 220 may request the status of the telemetry retrieval protocol (Netconf is OK?).

At 464, the telemetry broker 220 obtains a response from the MUD-capable device 310 indicating the operating state of the telemetry retrieval protocol.

The techniques presented above provide a discovery service of telemetry retrieval methods for telemetry devices and simplify the process of configuring delivery of telemetry data and services. An external entity (e.g., a management station, a broker, etc.) discovers which telemetry devices offer what type of telemetry data information using which telemetry retrieval protocols. The external entity discovers supported telemetry retrieval protocols that are required to configure the telemetry devices to gather and provide telemetry data.

In the techniques presented above, an external entity determines both supported telemetry retrieval methods defined at manufacturing time (i.e., static, and per device-type) using telemetry capability related information and extracts one or more commands from monitoring related information for detecting operational states and configuration changes of the telemetry retrieval methods at runtime (i.e., dynamic, and per-device as the telemetry device is deployed in the network). This way, information defined at manufacturing time can be amended or changed at runtime with additional information. In one example embodiment, MUD extensions (defined in MUD specification—Request for Comments (RFC) 8520) are used for retrieval-capability announcements. That is, MUD protocol may be used to describe and announce the telemetry retrieval methods of a telemetry device as offered by a manufacturer.

Figure 6:
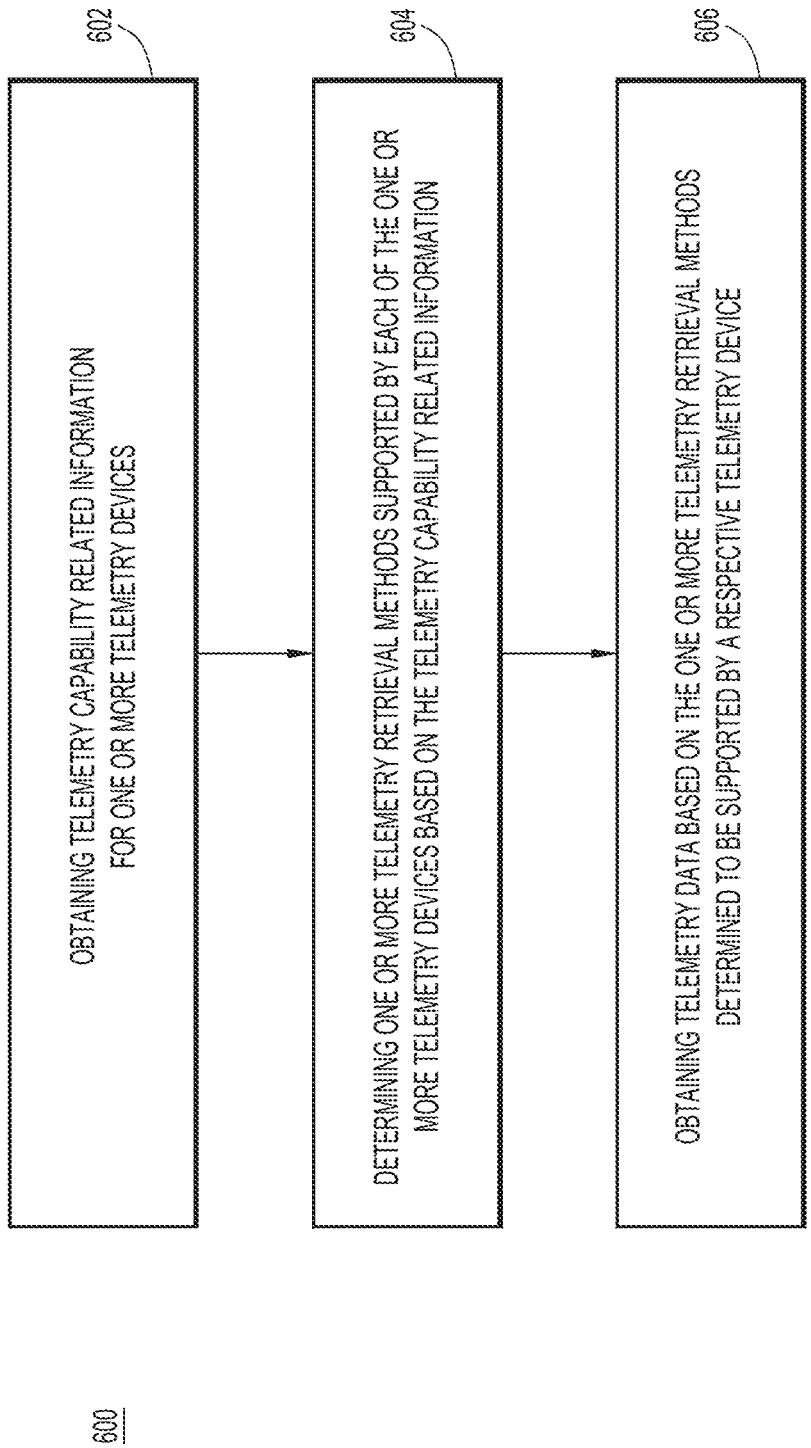
FIG. 6 is a flowchart illustrating a method of obtaining telemetry data from one or more telemetry devices based on supported retrieval methods by a respective telemetry device, according to an example embodiment.

FIG. 6 is a flowchart illustrating a method of 600 of obtaining telemetry data based on supported retrieval methods by a respective telemetry device, according to an example embodiment. The method 600 may be performed by a computing device such as a computing device 700 of FIG. 7, described below. In one example embodiment, the computing device is an external entity such as one of the telemetry consumer devices 120A-M. In another example embodiment, the computing device is a network controller or the network management entity 130 of FIG. 1. The computing device is a telemetry broker such as the telemetry broker 220 of FIGS. 2-4.

The method 600 involves at 602, obtaining telemetry capability related information for one or more telemetry devices.

The method 600 further involves at 604, determining one or more telemetry retrieval methods supported by each of the one or more telemetry devices based on the telemetry capability related information.

Additionally, the method 600 involves at 606, obtaining telemetry data based on the one or more telemetry retrieval methods determined to be supported by a respective telemetry device.

In one or more example embodiments, the operation 604 of determining the one or more telemetry retrieval methods supported by each of the one or more telemetry devices may include identifying an external entity based on the telemetry capability related information obtained from the respective telemetry device and obtaining, from the external entity, the one or more telemetry retrieval methods that include at least one telemetry retrieval protocol supported by the respective telemetry device and at least one configuration parameter for the at least one telemetry retrieval protocol.

In one instance, the telemetry device may be a telemetry source device. The method 600 may further involve establishing a connection with the telemetry source device to obtain, from the telemetry source device, the telemetry data using the at least one telemetry retrieval protocol and the at least one configuration parameter.

In one form, the at least one configuration parameter of the at least one telemetry retrieval protocol is changeable over time while the respective telemetry device is in an operational state.

According to one or more example embodiments, the method 600 may further involve subscribing to a telemetry service being executed on the respective telemetry device to obtain a change of the at least one configuration parameter. The telemetry service may be configured to detect one or more changes in telemetry capabilities of the respective telemetry device.

In one instance, the method 600 may further involve obtaining, from the telemetry service, at least one change in the at least one configuration parameter for the one or more telemetry retrieval methods used to retrieve the telemetry data from the respective telemetry device and reconfiguring an existing connection with the respective telemetry device to obtain the telemetry data based on the at least one change in the at least one configuration parameter.

In another form, the method 600 may further involve periodically polling the respective telemetry device to obtain an operating state of each of the one or more telemetry retrieval methods and reconfiguring at least one of an existing connection with the respective telemetry device or changing a telemetry retrieval method used for obtaining the telemetry data based on the operating state of the one or more telemetry retrieval methods.

According to one or more example embodiments, the telemetry capability related information may identify a location of a manufacturer usage description (MUD) file.

In another instance, the operation 604 of determining the one or more telemetry retrieval methods supported by each of the one or more telemetry devices may include obtaining the MUD file based on the telemetry capability related information obtained from the respective telemetry device and analyzing the MUD file to determine: the one or more telemetry retrieval methods which include a supported telemetry retrieval protocol, one or more configuration parameters for configuring the supported telemetry retrieval protocol, and monitoring related information to monitor a change in an operational state of the supported telemetry retrieval protocol or in the one or more configuration parameters of the supported telemetry retrieval protocol.

In one form, the method 600 may further involve subscribing to a telemetry monitoring service for obtaining the change in the one or more configuration parameters based on the monitoring related information.

In another form, the method 600 may further involve extracting one or more commands from the monitoring related information and querying the respective telemetry device using the one or more commands for the operational state of the supported telemetry retrieval protocol.

Figure 7:
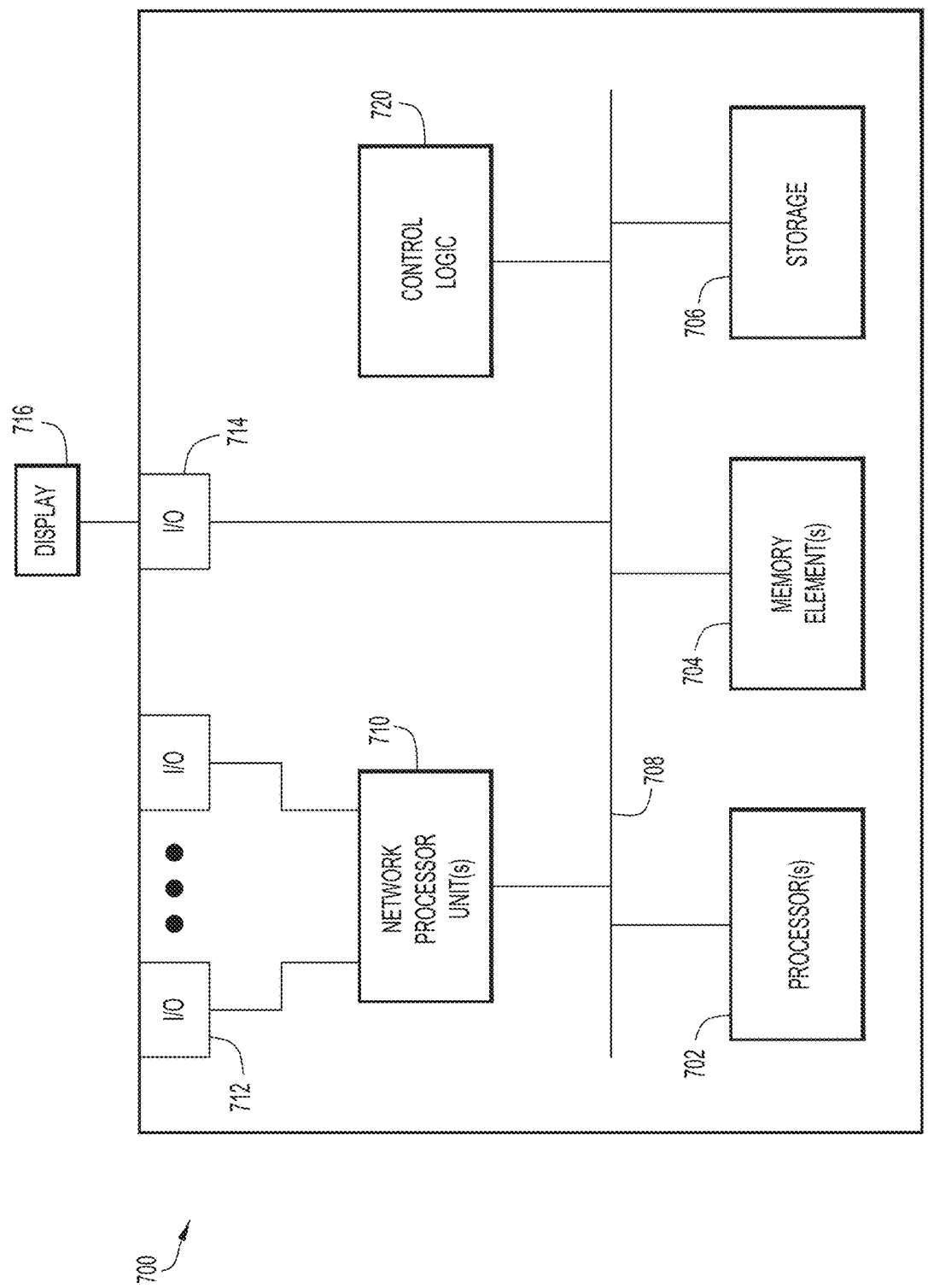
FIG. 7 is a hardware block diagram of a computing device configured to perform the techniques of obtaining telemetry data based on discovered telemetry capabilities of one or more telemetry devices, according to various example embodiments.

FIG. 7 is a hardware block diagram of a computing device 700 that may perform functions associated with any combination of operations in connection with the techniques depicted in FIGS. 1-6, according to various example embodiments, including, but not limited to, operations of the one or more entities or devices depicted in FIGS. 1-4 such as telemetry source devices 110A-N, telemetry consumer devices 120A-M, routing devices 140A-M, network management entity 130, a telemetry device 210, a MUD-capable device 310, telemetry broker 220, MUD file server 330, MUD manager 430, and MUD file server 440. It should be appreciated that FIG. 7 provides only an illustration of one example embodiment and does not imply any limitations with regards to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform various operations including obtaining telemetry capability related information for one or more telemetry devices, determining one or more telemetry retrieval methods supported by each of the one or more telemetry devices based on the telemetry capability related information and obtaining telemetry data based on the one or more telemetry retrieval methods determined to be supported by a respective telemetry device.

In yet another example embodiment, one or more non-transitory computer readable storage media encoded with software comprising computer executable instructions is provided. When the instructions are executed by a processor, they cause the processor to perform operations including obtaining telemetry capability related information for one or more telemetry devices, determining one or more telemetry retrieval methods supported by each of the one or more telemetry devices based on the telemetry capability related information, and obtaining telemetry data based on the one or more telemetry retrieval methods determined to be supported by a respective telemetry device.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a computing device, telemetry capability related information and telemetry data capability service information for one or more telemetry devices, wherein the telemetry capability related information identifies a location of a manufacturer usage description (MUD) file and the telemetry data capability service information includes a dynamic retrieval capability of a respective telemetry device;
    determining, by the computing device, one or more telemetry retrieval methods supported by a the respective telemetry device including:
        obtaining the MUD file based on the telemetry capability related information obtained from the respective telemetry device,
        analyzing the MUD file to determine the one or more telemetry retrieval methods which include a supported telemetry retrieval protocol and one or more configuration parameters for configuring the supported telemetry retrieval protocol, and
        based on the telemetry data capability service information, identifying a telemetry service executing on the respective telemetry device for detecting one or more changes in the one or more telemetry retrieval methods, wherein the one or more telemetry retrieval methods are for retrieving measurement data for determining performance of a network or a network device;
    obtaining telemetry data based on the one or more telemetry retrieval methods determined to be supported by the respective telemetry device; and
    obtaining, from the telemetry service executing on the respective telemetry device, an operational state of the one or more telemetry retrieval methods for determining whether to reconfigure the one or more telemetry retrieval methods by extracting one or more commands from the telemetry data capability service information and querying the respective telemetry device using the one or more commands for the operational state of the supported telemetry retrieval protocol.

2. The method of claim 1, wherein the one or more telemetry retrieval methods include at least two network management protocols for collecting performance-related measurement data and wherein determining the one or more telemetry retrieval methods includes:
    obtaining, at least one configuration parameter for a selected network management protocol from the at least two network management protocols.

3. The method of claim 2, wherein the respective telemetry device is a telemetry source device and further comprising:
    establishing a connection with the telemetry source device; and
    obtaining, from the telemetry source device, the performance-related measurement data for profiling the performance of the network device, using the selected network management protocol and the at least one configuration parameter.

4. The method of claim 2, wherein the at least one configuration parameter of the selected network management protocol is changeable over time while the respective telemetry device is in the operational state.

5. The method of claim 2, wherein obtaining the operational state of the one or more telemetry retrieval methods includes:
    subscribing to the telemetry service to obtain a change of the at least one configuration parameter, wherein the telemetry service is configured to send updates about the one or more changes in telemetry capabilities of the respective telemetry device.

6. The method of claim 5, wherein the respective telemetry device is a telemetry source device and further comprising:
    obtaining, by the computing device from the telemetry service, at least one change in the at least one configuration parameter for the one or more telemetry retrieval methods used to retrieve the telemetry data from the telemetry source device; and
    reconfiguring, by the computing device, an existing connection with the telemetry source device to obtain the telemetry data, based on the at least one change in the at least one configuration parameter.

7. The method of claim 1, further comprising:
    subscribing to the telemetry service for obtaining a change in the one or more configuration parameters based on the telemetry data capability service information.

8. An apparatus comprising:
    a network interface to receive and send packets in a network; and
    a processor, wherein the processor is configured to perform operations comprising:
    obtaining telemetry capability related information for one or more telemetry devices and telemetry data capability service information, wherein the telemetry capability related information identifies a location of a manufacturer usage description (MUD) file and the telemetry data capability service information includes a dynamic retrieval capability of a respective telemetry device;
determining one or more telemetry retrieval methods supported by a the respective telemetry device by:
    obtaining the MUD file based on the telemetry capability related information obtained from the respective telemetry device,
    analyzing the MUD file to determine the one or more telemetry retrieval methods which include a supported telemetry retrieval protocol and one or more configuration parameters for configuring the supported telemetry retrieval protocol, and
    based on the telemetry data capability service information, identifying a telemetry service executing on the respective telemetry device for detecting one or more changes in the one or more telemetry retrieval methods, wherein the one or more telemetry retrieval methods are for retrieving measurement data for determining performance of the network or a network device;
obtaining telemetry data based on the one or more telemetry retrieval methods determined to be supported by the respective telemetry device; and
obtaining, from the telemetry service executing on the respective telemetry device, an operational state of the one or more telemetry retrieval methods for determining whether to reconfigure the one or more telemetry retrieval methods by extracting one or more commands from the telemetry data capability service information and querying the respective telemetry device using the one or more commands for the operational state of the supported telemetry retrieval protocol.

9. The apparatus of claim 8, wherein the one or more telemetry retrieval methods include at least one network management protocol for collecting performance-related measurement data and wherein the processor is further configured to determine the one or more telemetry retrieval methods by obtaining at least one configuration parameter for the at least one network management protocol.

10. The apparatus of claim 9, wherein the respective telemetry device is a telemetry source device and the processor is further configured to perform:
    establishing, via the network interface, a connection with the telemetry source device; and
    obtaining, from the telemetry source device, the performance-related measurement data for profiling the performance of the network device, using the at least one network management protocol and the at least one configuration parameter.

11. One or more non-transitory computer readable storage media encoded with software comprising computer executable instructions that, when executed by a processor, cause the processor to perform operations including:
    obtaining telemetry capability related information and telemetry data capability service information for one or more telemetry devices, wherein the telemetry capability related information identifies a location of a manufacturer usage description (MUD) file and the telemetry data capability service information includes a dynamic retrieval capability of a respective telemetry device;
    determining one or more telemetry retrieval methods supported by a the respective telemetry device including:
        obtaining the MUD file based on the telemetry capability related information obtained from the respective telemetry device,
        analyzing the MUD file to determine the one or more telemetry retrieval methods which include a supported telemetry retrieval protocol, and one or more configuration parameters for configuring the supported telemetry retrieval protocol, and
        based on the telemetry data capability service information, identifying a telemetry service executing on the respective telemetry device for detecting one or more changes in the one or more telemetry retrieval methods, wherein the one or more telemetry retrieval methods are for retrieving measurement data for determining performance of a network or a network device;
    obtaining telemetry data based on the one or more telemetry retrieval methods determined to be supported by the respective telemetry device; and
    obtaining, from the telemetry service executing on the respective telemetry device, an operational state of the one or more telemetry retrieval methods for determining whether to reconfigure the one or more telemetry retrieval methods by extracting one or more commands from the telemetry data capability service information and querying the respective telemetry device using the one or more commands for the operational state of the supported telemetry retrieval protocol.

12. The one or more non-transitory computer readable storage media according to claim 11, wherein the one or more telemetry retrieval methods include at least one network management protocol for collecting performance-related measurement data and wherein the computer executable instructions cause the processor to determine the one or more telemetry retrieval methods by:
    obtaining, at least one configuration parameter for the at least one network management protocol.

13. The method of claim 1, wherein the one or more telemetry retrieval methods include at least one of: a System Logging Protocol (Syslog), a Simple Network Management Protocol (SNMP), a Network Configuration (Netconf) protocol, a Command-line Interface (CLI), or a Remote Procedure Call protocol.

14. The method of claim 1, wherein the one or more telemetry devices support different telemetry retrieval methods and include a telemetry source device and a telemetry consumer device, and further comprising:
    determining, by the computing device, a first telemetry retrieval protocol from a set of telemetry retrieval protocols that are supported by the telemetry source device and that matches one of a second set of telemetry retrieval protocols supported by the telemetry consumer device,
    wherein obtaining the telemetry data includes providing the telemetry data from the telemetry source device to the telemetry consumer device using the first telemetry retrieval protocol.

15. The method of claim 1, wherein the telemetry data capability service information identifies one or more telemetry services enabled on the respective telemetry device that includes at least one network command executable by the respective telemetry device for checking the operational state of the one or more telemetry retrieval methods.

16. The method of claim 1, wherein obtaining the telemetry capability related information includes:
    obtaining, by the computing device from a manager device, the telemetry capability related information, wherein the telemetry capability related information is retrieved by the manager device from a file server based on a request from the respective telemetry device.

17. The method of claim 1, further comprising:
establishing a connection with the respective telemetry device for retrieving, using a selected telemetry retrieval method, the measurement data for profiling the performance of the network device or the network, wherein the measurement data including at least one of: one or more interfaces visited or a queue depth at the respective telemetry device.

18. The apparatus of claim 9, wherein the at least one configuration parameter is changeable over time while the respective telemetry device is in the operational state.

19. The one or more non-transitory computer readable storage media according to claim 12, wherein the at least one configuration parameter is changeable over time while the respective telemetry device is in the operational state.

20. The one or more non-transitory computer readable storage media according to claim 19, wherein the computer executable instructions cause the processor to reconfigure an existing connection with the respective telemetry device to obtain the telemetry data, based on at least one change in the at least one configuration parameter.

\* \* \* \* \*